(12) United States Patent
Srinivasan et al.

(10) Patent No.: US 8,364,188 B2
(45) Date of Patent: Jan. 29, 2013

(54) METHOD AND CONTROLLER FOR ALLOCATING WHITESPACE SPECTRUM

(75) Inventors: Vikram Srinivasan, Bangalore (IN); Supratim Deb, Bangalore (IN)

(73) Assignee: Alcatel Lucent, Paris (FR)

( * ) Notice: Subject to any disclaimer, the term of this patent is extended or adjusted under 35 U.S.C. 154(b) by 404 days.

(21) Appl. No.: 12/801,365

(22) Filed: Jun. 4, 2010

(65) Prior Publication Data
US 2011/0300891 A1 Dec. 8, 2011

(51) Int. Cl.
*H04W 72/08* (2009.01)

(52) U.S. Cl. ............... 455/510; 455/450; 455/452.1; 455/63.1; 370/329; 370/252

(58) Field of Classification Search ............ 455/510, 455/450, 452.1, 512, 513, 63.1, 456.3, 509, 455/422, 451, 453, 507, 517, 67.13, 444; 370/329, 310, 328, 330, 252, 334, 230
See application file for complete search history.

(56) References Cited

U.S. PATENT DOCUMENTS

| | | | | |
|---|---|---|---|---|
| 6,982,969 | B1 * | 1/2006 | Carneal et al. | 370/329 |
| 7,453,804 | B1 * | 11/2008 | Feroz et al. | 370/230 |
| 2006/0023666 | A1 * | 2/2006 | Jalali et al. | 370/334 |
| 2008/0049672 | A1 * | 2/2008 | Barak et al. | 370/330 |
| 2008/0090575 | A1 * | 4/2008 | Barak et al. | 455/444 |
| 2010/0278117 | A1 * | 11/2010 | Sharma et al. | 370/329 |
| 2011/0128920 | A1 * | 6/2011 | Lee et al. | 370/329 |
| 2011/0299479 | A1 * | 12/2011 | Deb et al. | 370/329 |
| 2012/0190386 | A1 * | 7/2012 | Anderson | 455/456.3 |

OTHER PUBLICATIONS

Ranveer Chandra, et al., "A Case for Adapting Channel Width in Wireless Networks", University of California Santa Barbara, CA, Microsoft Research, Redmond, WA, SIGCOMM Aug. 17-22, 2008, 12 pages.
Paramvir Bahl, et al., "White Space Networking with Wi-Fi like Connectivity," Microsoft Research, Redmond, WA, Harvard University, Cambridge MA, SIGCOMM, Aug. 17-21, 2009, 12 pages.
Hiroshi Harada, "A Software Defined Cognitive Radio Protype," National Institute of Information and Communication Technology, IEEE International Symposium on Personal, Indoor and Mobile Radio Communications, Mar. 26, 2010, 5 pages.
N. Ahmed, et al., "SMARTA: A Self-Managing Architecture for Thin Access Points," School of Computer Science, University of Waterloo, CoNext, Dec. 4-7, 2006, 12 pages.
Dragos Niculescu, "Interference Map for 802.11 Networks," NEC Laboratories America, IMC, Oct. 24-26, 2007, 12 pages.
Paramvir Bahl, et al., "White Space Networking with Wi-Fi like Connectivity," Microsoft Research, SIGCOMM, Aug. 17-21, 2009, 12 pages.
Yuan Yuan, et al., "Allocating Dynamic Time-Spectrum Blocks In Cognitive Radio Networks," Microsoft Research, MobiHoc, Sep. 9-14, 2007, 10 pages.
Milind M. Buddhikot, et al., "Spectrum Management in Coordinated Dynamic Spectrum Access Based Cellular Networks," Lucent Bell Labs, IEEE DySPAN, Nov. 2005, 9 pages.

(Continued)

*Primary Examiner* — Tan Trinh
(74) *Attorney, Agent, or Firm* — Harness, Dickey & Pierce

(57) ABSTRACT

Disclosed is a method and apparatus for allocating a set of frequency bands to a plurality of access points. The method includes generating an interference map associated with the set of frequency bands and associated with the plurality of access points. The method includes aggregating a plurality of demands to produce an aggregate demand. Each of the plurality of demands associated with one of the plurality of access points. The method includes dynamically allocating the set of frequency bands to each of the plurality of access points based on the interference map and the aggregate demand.

20 Claims, 7 Drawing Sheets

Dynamic Spectrum Allocation Engine

OTHER PUBLICATIONS

Milind M. Buddhikot, et al., "DIMSUMNet: New Directions in Wireless Networking Using Coordinated Dynamic Spectrum Access," Lucent Bell Labs, IEEE, Jun. 2005, 11 pages.

Jitendra Padhye, et al., "Estimation of Link Interference in Static Multi-hop Wireless Networks," Microsoft Research, 2005, 6 pages.

Thomas Moscibroda, et al., "Load-Aware Spectrum Distribution in Wireless LANs," Microsoft Research, 2008, 10 pages.

Srihari Narlanka, et al., "A Hardware Platform for Utilizing TV Bands With a Wi-Fi Radio," Microsoft Research, 2007, 5 pages.

Yuan Yuan, et al., "KNOWS: Kognitiv Networking Over White Spaces," Microsoft Research, 2007, 12 pages.

* cited by examiner

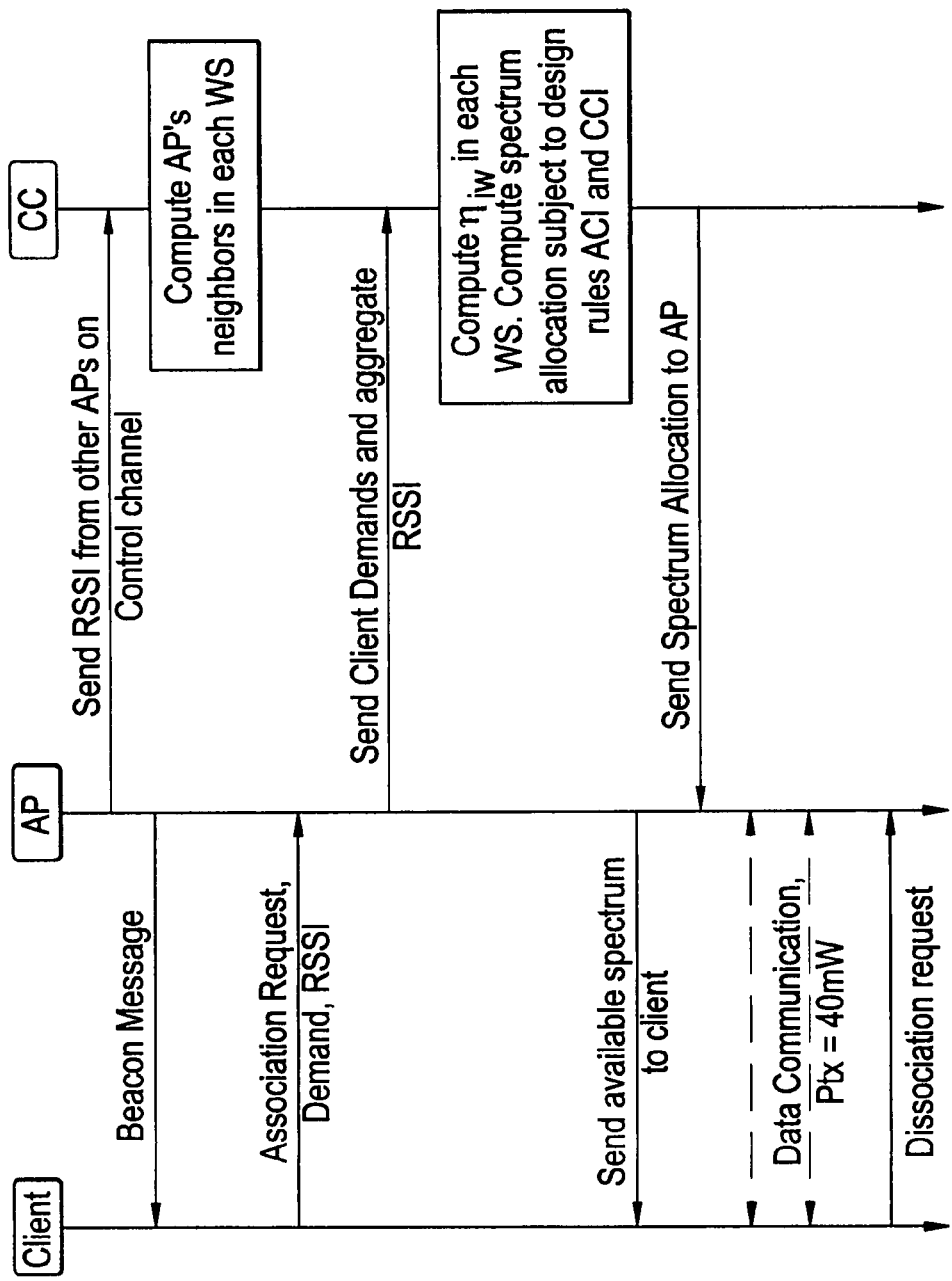

METHOD AND CONTROLLER FOR ALLOCATING WHITESPACE SPECTRUM

BACKGROUND OF THE INVENTION

Embodiments relate to systems and methods for Wi-Fi like, unlicensed access in digital television (DTV) whitespaces in an enterprise setting.

Many countries are migrating from analog to digital television broadcasts. For example, in the US, this transition happened on Jun. 12, 2009; while in the UK, this transition is slated to happen in a phased manner from 2008 to 2012. In analog transmission, each TV channel uses a 6 MHz slice of bandwidth, but digital transmissions have the ability to pack four "programs" into one 6 MHz channel. Thus, this analog-to-digital transition frees up a substantial amount of television spectrum that was previously used by analog transmissions.

The newly freed up spectrum (along with other slices of unused spectrum in the 50-700 MHz (channels 2-51) television band is known as DTV whitespace (DTV-WS). Signals in the DTV spectrum propagate over long distances and penetrate through obstacles more easily. According to a recent study, 100 to 250 MHz of DTV-WS will be made available depending on the local market. The large amount of spectrum and its superior propagation characteristics make the DTV-WS a highly attractive proposition for wireless broadband deployment and usage.

In November 2008, the FCC ruled that the digital TV whitespaces may be used for unlicensed access by fixed and portable devices. Fixed devices (e.g., IEEE 802.22 base stations) are used for providing last mile internet access in underserved areas, while portable devices may be used to provide short range wireless connectivity for Internet access (e.g., Wi-Fi like access points). Furthermore, the FCC ruled that portable devices could only transmit in channels 21-51 (i.e., 512-698 MHz) and use a transmit power of 40 mW when adjacent to a TV channel in the frequency band and 100 mW on a non-adjacent channel. Additional restrictions on out-of-band emissions may also apply.

Many experts believe the FCC ruling may cause the next wireless revolution. The short range wireless access in DTV-WS has been referred to as "Wi-Fi on steroids" and "Wi-Fi 2.0" in the media. Indeed, unlicensed access in DTV-WS may decrease congestion on the 2.4 GHz ISM band, and may provide improved data rates and coverage due to the propagation properties of the spectrum.

SUMMARY OF THE INVENTION

The present invention relates to a controller and method for allocating whitespace spectrum.

In one embodiment, the controller includes a first module, a second module and a third module. The first module is configured to generate an interference map associated with a set of frequency bands and associated with a plurality of access points. The second module is configured to aggregate a plurality of demands to produce an aggregate demand. Each of the plurality of demands is associated with one of the plurality of access points. The third module is configured to dynamically allocate the set of frequency bands to each of the plurality of access points based on the interference map and the aggregate demand.

In one embodiment, the method includes generating an interference map associated with the set of frequency bands and associated with the plurality of access points. The method includes aggregating a plurality of demands to produce an aggregate demand. Each of the plurality of demands associated with one of the plurality of access points. The method includes dynamically allocating the set of frequency bands to each of the plurality of access points based on the interference map and the aggregate demand.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 9 is a signal flow diagram associated with allocation of whitespace frequency bands according example embodiments.

Figure 1:
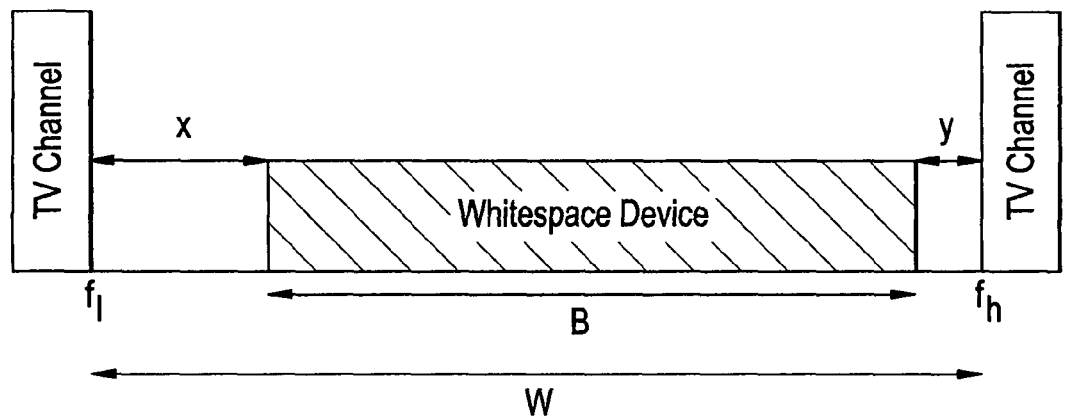
FIG. 1 illustrates a whitespace frequency spectrum according to example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "client" may be considered synonymous to, and may hereafter be occasionally referred to, as a mobile, mobile unit, mobile station, mobile user, user equipment, subscriber, user, remote station, access terminal, receiver, etc., and may describe a remote user of wireless resources in a wireless communication network. The term "access point" may be considered synonymous to and/or referred to as a base station, base transceiver station (BTS), NodeB, extended NodeB, evolved NodeB, femto cell, pico cell, etc. and may describe equipment that provides the radio baseband functions for data and/or voice connectivity between a network and one or more users.

In the following description, the term "Wi-Fi like" system is used to describe a wireless LAN with (i) access points (APs) connected to the Internet, and (ii) clients who associate with the APs. Further, example embodiments may employ enterprise settings to allow a system and architecture for which a central controller may be configured to perform efficient spectrum allocation based on access point demands.

Initially, this disclosure will describe the effect of frequency dependent radio propagation and out of band emissions on an example system. Next, this disclosure will describe algorithms to base an exemplary system on. Next, this disclosure will describe an example embodiment of a multi-radio based architecture taking into consideration the effect of frequency dependent radio propagation, out of band emissions and the aforementioned algorithms. Next, this disclosure will describe algorithms to efficiently allocate variable spectrum to access points based on their demand. Finally, an example embodiment of a method using the architecture and the algorithms will be described.

Those skilled in the art will recognize that spectrum sensing techniques for wireless devices, etc. are available to the example system. Moreover, those skilled in the art will recognize example embodiments use available whitespaces for a given location that may vary slowly over time.

FIG. 1 illustrates a whitespace frequency spectrum according to example embodiments. As shown in FIG. 1, on either end of the spectrum is a DTV channel. The whitespace frequency spectrum includes a channel of bandwidth W. The channel of bandwidth W includes a low guard band x and a high guard band y. The channel of bandwidth W further includes a usable bandwidth or transmission spectrum B.

The following algorithms are algorithms used to base an exemplary system on.

Frequency Dependent Radio Propagation

In free space, the received power at a distance d from a point source radiating at wavelength λ with power $P_t$ and antenna gain G is:

$$P_r = GP_t(\lambda/4\pi d)^2. \quad (1)$$

To account for additional phenomenon that occur in the real-world (e.g., reflection, diffraction and scattering) the following path loss model in the range 900 MHz-100 GHz has been recommended:

$$PL(d) = 10 \log_{10} f_c^2 + 10\eta \log_{10} d + Lf(n) - 28 \text{ (dB)}. \quad (2)$$

Where:
PL(d) is the path loss model,
$f_c$ is the carrier frequency,
η is the path loss coefficient, and
Lf(n) is the additional loss due to the number of floors n between the transmitter and receiver.

Thus, there is an $f_c^2$ dependence of the path-loss on the frequency.

Out of Band Emissions

Signals transmitted by a radio are never entirely confined within the intended bandwidth B. Out-of band emission (OE) is the signal energy that leaks outside the main band. Regulatory authorities and standardization bodies typically prescribe a spectrum mask for any technology in a particular band of operation. The mask specifies the rate at which the power spectral density (PSD) decays relative to the peak power spectral density outside the intended band of transmission. For example, the IEEE 802.11g standard specifies the PSD decay at a rate of 1.1 dB/MHz.

The OE of a transmitter, at a frequency f MHz away from the edge of a B Hz wide transmission spectrum is given by:

$$OE(f) = \frac{P_t L}{B} e^{-\alpha f} \quad (3)$$

Where, L and α are constants that depend on the spectrum mask. For example, L=-20 dBr, α=-1:1 dB/MHz for the IEEE 802.11g spectrum mask. Therefore the measured emissions outside the intended band will be determined by the peak power spectral density, L and α specified by the spectrum mask.

The spectrum mask allows determination of adjacent channel interference (ACI) precisely. For example, if two devices are separated by a distance d in free space, the first device is transmitting at power $P_t$ over a bandwidth B in frequency band $f_c$, the second device is receiving over a bandwidth of W, and there is a guard band of δ between the two bands, then the total adjacent channel interference (ACI) may be computed by integrating the leakage power over the adjacent channel of bandwidth W, using equation 2 and equation 3 with Lf(n)=0 as:

$$\frac{P_t L 10^{2.8}}{B d^\eta f_c^2 \alpha} e^{-\alpha \delta}(1 - e^{\alpha W}) \quad (4)$$

System Algorithms

An exemplary system may determine transmit power, determine guard bands between adjacent slices of the spectrum, develop interference graphs in different whitespaces and may rely on a devised metric called aggregate spectral efficiency (units are bits/sec/Hz) that captures the average data rate that each access point may receive from unit bandwidth in different whitespaces.

Equation 2 above may be modified to meet FCC requirements briefly described above for digital television transmission such that:

$$PL_{dtv}(d) = 10 \log_{10} f_c^2 + 10\eta \log_{10} d + Lf(n) - 10 \text{ (dB)}. \quad (5)$$

Where:
$PL_{dtv}(d)$ is the path loss model for a digital transmission,
$f_c$ is the carrier frequency,
η is the path loss coefficient, and
Lf(n) is the additional loss due to the number of floors n between the transmitter and receiver.

Consider a single transmit-receive pair separated by distance d in a single DTV whitespace of width W MHz. Assume an additive white gaussian noise (AWGN) channel with noise power spectral density $N_o$, if the whitespace spans from frequency $f_1$ to $f_h$, with $f_h - f_1 = W$, if there is a guard band of x (y) MHz between the DTV channel on the left (and the right) and the whitespace transmission to avoid ACI to DTV receivers, and if B MHz is used for transmission by the transmit-receive pair, then the path loss between the transmit-receive pair may be given by Equation 2, where Lf(n) is zero.

For example, if the whitespace device has a spectrum mask with parameters L and α as in Equation 3, the path loss to the DTV receiver at distance 10 m is given by $PL_{dtv}(10)$ as in Equation 5, the maximum interference that can leak into the DTV receiver is given by $I_{dtv}$, and if the system operates in a high SNR regime, i.e., SNR>>1, then maximizing the Shannon capacity may result in an optimal transmit power.

For example to calculate an optimal transmit power, first calculate an optimum bandwidth B as:

$$B = \min\left(W, \frac{1}{\alpha}\log\left(\frac{4\gamma f_l^2}{N_o(2f_l + W + z)^2}\right) + \frac{W+z}{2}\right) \quad (6)$$

Second, calculate an optimum capacity C using a Shannon capacity formula and based on the calculated optimum bandwidth B as:

$$C = B\left[\log_2\left(\frac{4\gamma f_l^2}{N_o(2f_l + W + z)^2}\right) + \alpha x \log_2 e\right] \quad (7)$$

Finally, calculate an optimal transmit power P as:

$$P = \gamma f_l^2 e^{\alpha x} \quad (8)$$

Where for each of equations 6, 7 and 8:

$$z = \frac{2}{\alpha}\log_e\left(\frac{f_h}{f_l}\right),$$

$$x = \frac{W+z-B}{2},$$

$$y = \frac{W-z-B}{2},$$

$$\gamma = \frac{I_{dtv}\alpha}{L(1-e^{-6\alpha})}\left(\frac{10}{d}\right)^\eta,$$

W is the available whitespace bandwidth,
L and α are constants that depend on the spectrum mask, $f_l$ is the low frequency value of W,
$f_h$ is the high frequency value of W,
$I_{dtv}$ is the maximum interference which can leak into a DTV receiver, and d is a distance from a point source (e.g. access point antenna).

Preferably, in a whitespace W that is to be shared between several access points, each access point receives at least a bandwidth of 6 MHz and the transmit power for each access point may be set to 40 mW.

If each access point provides coverage up to a distance d, then to compute the worst case adjacent channel interference (ACI), we assume that two clients, A and B are communicating with two radios $r_A$ and $r_B$ respectively. The two radios $r_A$ and $r_B$ need not be associated with the same access point. Client A may be located at the edge of the transmission range of radio $r_A$.

If radio $r_A$ receives a signal from Client A over bandwidth $B_m$ and radio $r_B$ simultaneously transmits a signal to Client B over a bandwidth of 6 MHz, the bandwidths for Client A and Client B may be chosen so as to maximize the ACI as shown by equation 4, then there may be at least two cases for which the guard band may be calculated: (i) the two radios $r_A$ and $r_B$ belong to the same access point and (ii) if radio $r_A$ and radio $r_B$ belong to different access points separated by a distance $d_{aci}$.

For both cases, the guard band x may be calculated such that:

$$x = \frac{1}{\alpha} \log_e \left( \frac{\frac{\gamma P L (1 - e^{-\alpha B_m})}{6\alpha}}{\frac{P 10^{2.8}}{d^\eta f_c^2} - \gamma N_o B_m} \right) \quad (9)$$

Preferably, for the first case successful reception at radio $r_A$ requires a minimum SINR threshold of γ where:

$$\frac{\frac{P 10^{2.8}}{d^\eta f_c^2}}{\frac{P L e^{-\alpha x}(1 - e^{-\alpha B_m})}{6\alpha} + N_o B_m} \geq \gamma \quad (10)$$

Preferably, fc=fc(max)=698 MHz, transmit power=40 mW, range=50 m, a worst case η=4.5 and γ=6 dB, results in a maximum possible adjacent channel separation of about 20 MHz for the first case. Further, even with $f_c$ as low as 512 MHz, the channel separation decreases only marginally. The corresponding channel separation in the 2.4 GHz ISM band increases to about 25 MHz.

The guard band in the second case, with the same settings as above, and calculations based on equation 9 with $d_{aci}$ as small as 2 m, the guard band requirement falls to zero.

A known method to mitigate co-channel interference between two wireless devices (not talking to each other) is to ensure that they are allotted the same channel only if the received power from one device at the other device is less than a certain threshold 13. In example embodiments, the path loss depends on frequency. Therefore, two access points that interfere with each other in one part of the spectrum need not do so in another part of the spectrum. Therefore, the interference graph between different access points in the system is a function of the whitespace that is being used. This effect may be much more pronounced if access to portable devices is across DTV Channels 2-51.

In example embodiments, a received power measurement in one part of the spectrum may be used to infer a received power in some other part of the spectrum. Consider two access points $AP_1$ and $AP_2$. If $AP_1$ is transmitting using power P and $P_r(f_1)$ is the received power at $AP_2$ when the transmission is performed using carrier frequency $f_1$, and $P_r(f_2)$ is defined in the same manner, then using Equation 2, it can be shown that in the absence of ambient interference:

$$P_r(f_1) - P_r(f_2) = 10 coeff \log\left(\frac{f_2}{f_1}\right) \quad (11)$$

where coeff is an environment dependent parameter that may be obtained through system measurements. Preferably, the value of coeff, in a system having ideal conditions, is 2. Further, in the presence of ambient interference; the difference in ambient interferences in $f_1$ and $f_2$ may be added to the right hand side of equation 11.

Equation 11 shows that if either of $P_r(f_1)$ or $P_r(f_2)$ is known, then the other may be inferred. If each access point experiences a different ambient interference in each whitespace, then a two step process may be followed. In the first step, each access point reports (e.g., via a control channel) the ambient interference the access point experiences in each whitespace to, for example, a central controller. In the second step, measurements in any one frequency band may be used to estimate if the total interference (e.g., ambient plus induced interference) experienced by the access point in the other frequency band exceeds a given threshold. Preferably, the lower frequency bands may be used to estimate interference graphs in the higher frequency bands because for a given receiver sensitivity, control messages in the lower frequency band are more likely to be received by an access point.

Efficiently allocating demand based spectrum to access points may require the knowledge of how much data rate does a given amount of spectrum translate to for each access point in each whitespace. A simple solution is to do a worst case design where the data rate for a given amount of spectrum is achieved using the lowest modulation. This is equivalent to assuming that all users are at the edge of the coverage region which is clearly too conservative. A worst case design is not desirable for obvious reasons.

Example embodiments introduce a metric called aggregate spectral efficiency (ASE). The ASE metric may capture the dependence between a given amount of spectrum and data rate based on (i) the RSSI values of all clients associated with an access point and (ii) the location of the spectrum. By using ASE, worst case design scenarios may be avoided.

To derive the ASE metric (η) determine how the data rate depends on SINR. In the ideal case this is given by Shannon's formula, which essentially shows that the spectral efficiency (bits/sec/Hz) is a constant multiplier of the SINR in dB. For many modern physical layer technologies, for a given bit error rate, the achieved spectral efficiency takes discrete values that depend on SINR thresholds. Moreover, these discrete values vary linearly with the SINR thresholds in dB. If spectral efficiency varies with SINR as a+bSINR(dB) for some constants a and b that depend on the physical layer technology and a client k perceives $SINR_k(f_1)(dB)$, then the spectral efficiency for the kth client is $\eta_k(f_1) = a + b SINR_k(f_1)$. If there are N clients and each client has equal opportunity to communicate with the access point, then the ASE is given by:

$$\eta_{avg}(f_1) = a + \frac{b}{N}\sum_{k=1}^{b} SINR_k(f_1) \quad (12)$$

Equation 12 shows that in a given band, the ASE may be inferred from measurements of SINR. If every client experiences an average interference $I_{th}$, then an estimate of ASE across all bands in the spectrum may be computed without having to do measurements in each band. If two carrier frequencies $f_1$ and $f_2$ with $f_1 < f_2$, and $RSSI_k(f_1)$ and $RSSI_k(f_2)$ are the received signal strengths in dB for the $k_{th}$ client, $SINR_k(t) = RSSI_k(f_i) - I_{th}$, then $SINR_k(f_2) - SINR_k(f_1) = RSSI_k(f_2) - RSSI_k(f_1) = 20 \log_{10}(f_1/f_2)$, from which it follows that:

$$\eta_{avg}(f_1) - \eta_{avg}(f_2) = 20 \log_{10}(f_1/f_2) \quad (13)$$

Multi-Radio Based Architecture

Figure 2:
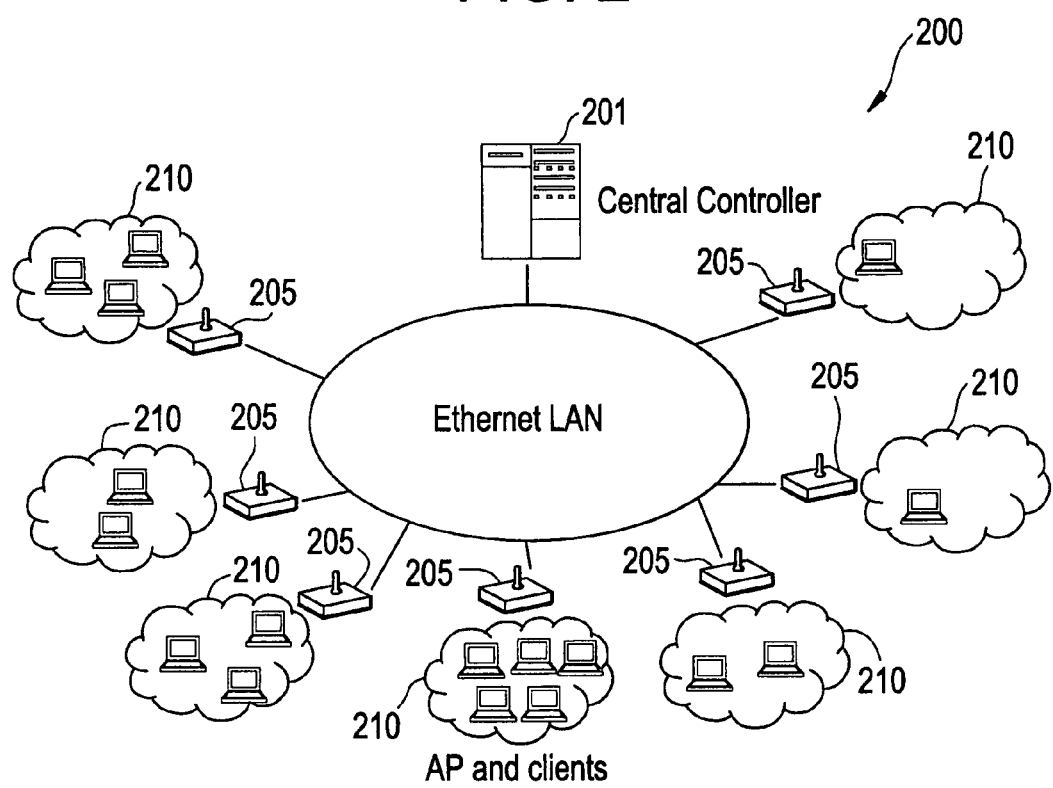
FIG. 2 illustrates a system architecture according to example embodiments.

FIG. 2 illustrates a system architecture 200 according to example embodiments. As shown in FIG. 2, the system architecture 200 may include a central controller 201 communicatively connected to one or more access points 205. The access points 205 may be communicatively connected to one or more clients or users 210. Note, at any given moment in time, an access point 205 may not have a client or user associated with the access point 205.

An access point 205 may be configured to be portable and may be configured to sense wireless microphones/TV signals up to, for example, −114 dBm. Each access point 205 includes multiple transceivers. At least one transceiver may be dedicated for communications over a common control channel. The control channel serves three purposes. First, the control channel is used for client-access point 205 associations. Second, the control channel is used to make measurements to infer interference graphs over the whitespaces. Third, the control channel is used to make measurements to compute the aggregate spectral efficiency (ASE) across all whitespaces. The medium access mechanism used for the control channel may be a design choice and is not discussed for the sake of brevity.

The control channel may operate over a frequency band lower than DTV channel 21. As is discussed above, the interference graph in a higher frequency band may be inferred from measurements over the control channel located at a lower frequency. Preferably, the control channel may be an industrial, scientific and medical (ISM) band channel (e.g., 433 MHz) because the ISM band channel is available at all locations all the time.

All other transceivers may be configured to tune into any set of authorized whitespace frequencies. For example, existing radio technologies allow transceivers to tune across several GHz. However, each radio may tune to only a single contiguous band at any given time. Modifying the bandwidth on demand may be achievable in Orthogonal frequency-division multiplexing (OFDM) based systems as is known and is referred to as channel bonding.

The clients 210 have one or more radios. The clients 210 may be configured as portable devices in a master slave relationship either with a fixed device or another portable device (e.g., an access point 205). If a client has a single radio, then the client first tunes into the control channel and listens for beacon messages from the various access points 205. While several complex client-access point association decisions may be possible, in example embodiments the client sends an association request to the access point 205 from which the beacon message is received with the greatest signal strength. The association request message may contain the MAC ID of the clients 210, desired data rate (demand) and received signal strength indication (RSSI) from the access point 205. If the association request is accepted, then the access point 205 responds with the set of whitespaces, center frequencies and bandwidths over which the client may communicate.

If a client is finished with its session, the client sends a dissociation request to the access point 205. Alternatively, if an access point 205 does not receive transmissions from the client for more than a certain period of time, then the access point 205 assumes that the client is no longer associated with the access point 205.

The central controller 201 may be configured to periodically compute the interference graphs in the different whitespaces. Computing the interference graphs may be performed using measurements over a single control channel. The central controller 201 may be configured to compute the ASE for each access point 205 in the different whitespaces based on control channel aggregate RSSI measurements provided by each access point 205. The central controller 201 may be configured to compute an efficient allocation of the available whitespaces based on interference maps, ASEs, ACI constraints, transmit power constraints, and demands. Example embodiments of the central controller 201 will be described in more detail below.

Algorithms for Whitespace Spectrum Allocation

Next, three algorithms for proportionally fair whitespace spectrum allocation (PF-WSA) will be discussed. The first and second algorithms may be used for spectrum allocation in a single whitespace. The third algorithm may be used for multiple whitespace spectrum allocation.

Algorithm one (PfSpecAllocClique) is based on proportionally fair spectrum allocation of a clique. A clique is a grouping of access points 205. Pseudo-code for algorithm one is as follows:

---

Algorithm 1 PfSpecAllocClique: Prop. Fair Spectrum Allocation in $WS_j$ when the interference graph is a Clique $C_G$ 1:    for all nodes $y \in C_G$ do
2:    Define the utility as a function of bandwidth by accounting for the spectral efficiency. Define
        $U_y(b) = d_y \log(1 + (\eta_{y,j}b - m_y)^+)$, $b \geq 6$,
and $U_y(b) = 0$ for $b < b_m = 6$.
3:    Quantize the utility as follows. Compute the bandwidth required to get an utility of $\epsilon_q(1 + \epsilon_q)^r$, $r = 0, 1, 2,, r_{y,max}$, where $r_{y,max}$ depends on the demand $d_y$. In other words, compute
        $q_y(r) = \min \{b: U_y(b) \geq \epsilon_q(1 + \epsilon_q)^r\}$.
4:    end for
5:    Initialize spectrum given to $AP_y$ as $b_y := 0$ for every $y \in C_G$. Also denote by $r_y$ (valid only when $b_y > 0$) the bandwidth offered to $AP_y$ in terms of what quantized level is reached by $U_y(\cdot)$.
6:    Initialize used bandwidth as $UB := 0$ and $Y := C_G$. Also, $W$ is the width of the WS.
7:    while $UB < W$ or $Y \neq \emptyset$ do
8:      for all $y \in Y$ do
9:      Compute slope(y) as follows:

$$\text{slope}(y) = \begin{cases} \dfrac{\epsilon_q(1+\epsilon_q)^{r_y+1} - \epsilon_q(1+\epsilon_q)^{r_y}}{q_y(r_y+1) - q_y(r_y)}; & b_y \neq 0 \\ \max_{s \geq 0} \dfrac{\epsilon_q(1+\epsilon_q)^s}{q_y(s)}; & b_y = 0 \end{cases}$$

10:      if $b_y = 0$ then
11:

$$\delta_y = \arg\max_{s \geq 0} \frac{\epsilon_q(1+\epsilon_q)^s}{q_y(s)}$$

-continued

Algorithm 1 PfSpecAllocClique: Prop. Fair Spectrum Allocation in $WS_j$ when the interference graph is a Clique $C_G$ 12:     else
13:         $\delta_y = 1$
14:     end if
15:   end for
16:   Among nodes in y' ∈ Y, find the node $y_m$ such that $$y_m = \arg\max_y [\text{slope}(y)]$$

{$y_m$ is the node that best utilizes the spectrum for going to the next quanta.}
17:   UB ← UB + $(q_{y_m}(r_{y_m} + \delta_{y_m}) - q_{y_m}(r_{y_m}))$
18:   If $b_{y_m} = 0$, then set $r_{y_m} = \delta_{y_m}$; else update $r_{y_m} \leftarrow r_{y_m} + \delta_{y_m}$
19:   $b_{y_m} \leftarrow q_{y_m}(r_{y_m})$
20:   if $r_{y_m} = r_{y_m\text{-}max}$ then
21:       Y ← Y − {$y_m$}
22:   end if
23:   end while
24:   if UB > W then
25:       $r_{y_m} \leftarrow r_{y_m} - \delta_{y_m}$
26:   end if
27:   Compute the total utility $TU(C_G)$ attainable by the nodes in $C_G$, and total bandwidth used $TB(C_G)$ by these nodes as $$TU(C_G) = \sum_{y \in C_G, b_y > 0} \varepsilon_q (1 + \varepsilon_q)^{r_y}, \quad TB(C_G) = \sum_{y \in C_G} b_y$$

28    if $TU(C_G) < U_{y_m}(\delta_{y_m})$ then
29:       $TU(C_G) = U_{y_m}(\delta_{y_m})$, and $r_{y_m} = \delta_{y_m}$ and $r_i = 0$ for $i \neq y_m$.
30:   end if Algorithm one starts by expressing the achievable log utility of an access point 205 in terms of the bandwidth, and then quantizing the data rates in steps of $\varepsilon_q$; $\varepsilon_q(1+\varepsilon_q)$; $\varepsilon_q(1+\varepsilon_q)2$; $\varepsilon_q(1+\varepsilon_q)3$; : : : . (steps 1-4). Parameter $\varepsilon_q$ may be chosen to balance computational complexity and accuracy of the algorithm. Then the algorithm greedily assigns spectrum to the access point 205 until the total whitespace width is exhausted (step 5-23). At each stage of the greedy allocations, the following two requirements may be met:

If an access point 205 is assigned spectrum in a greedy stage, then assign sufficient spectrum so that the access points' log utility becomes $\varepsilon_q(1+\varepsilon_q)^r$ for some r. Also, if an access point 205 has already been allocated some spectrum, then the greedy choice may allocate enough spectrum for the utility to increase by one quantization level, for example, the greedy step increases the log utility from $\varepsilon_q(1+\varepsilon_q)^r$ to $\varepsilon_q(1+\varepsilon_q)^{r+1}$.

The greedy choice may be to assign spectrum to the access point 205 for which allocating spectrum for increasing the log utility to one of the next quantization levels is spectrally most efficient. There are two cases depending on whether an access point 205 had been allocated spectrum until the previous greedy step or not. If access point $AP_y$ was not allocated any spectrum until the previous greedy step, then we compute slope(y) as:

$$\text{slope}(y) = \max_{s \geq 0} \frac{\varepsilon_q(1+\varepsilon_q)^s}{q_y(s)} \quad (13)$$

On the other hand, if $AP_y$ was allocated spectrum until the previous step so that the utility was $\varepsilon_q(1+\varepsilon_q)^{r_y}$, then slope(y) is computed as:

$$\text{slope}(y) = \frac{\varepsilon_q(1+\varepsilon_q)^{r_y+1} - \varepsilon_q(1+\varepsilon_q)^s}{q_y(r_y+1) - q_y(r_y)} \quad (14)$$

The algorithm may compute the total utility achieved by the clique. The updates in the last iteration of the greedy choice may be discarded if the used bandwidth exceeds the available bandwidth of the whitespace (step 24). However, if the last iteration contributes to the utility more than the other iterations combined, then the bandwidth may be allocated to the greedy choice in the last iteration (step 28).

Algorithm two (BestNeighborhoodFirst) is based on spectrum allocation using general interference graphs. Pseudocode for algorithm two is as follows:

Algorithm 2 BestNeighborhoodfirst: Greedy Algorithm for PF-WSA

1:  Let G denote the graph formed by the interference maps of each nodes. Initialize $G_{cand} := G$ as the graph on which we will next perform greedy allocation of spectrum. At each step, $G_{cand}$ only consists of AP's that are candidate for allocation.
2:  while $G_{cand}$ has at least one node do
3:      for all u ∈ $G_{cand}$ do {$G_{cand}$ denotes the interference graph in this $WS_j$}
4:          Initialize TU(u), the total capacity attainable by the nodes in the neighborhood of u as TU(u) := 0.
5:          Let $CN_{uj}$ be the candidate neighbors for spectrum allocation. Initialize $CN_{uj} := N_{uj} \cap$ {v:v belongsto $G_{cand}$}.
6:          while $CN_{uj} \neq \emptyset$ do
7:              for all v ∈ $CN_{uj}$ do
8:                  Find nodes that belong to $CN_{uj} \cap N_{vj}$.
9:                  Apply PfSpecAllocClique to $CN_{uj} \cap N_{vj}$ to compute (i) the total capacity TU(u, v) attainable by the nodes in $CN_{uj} \cap N_{vj}$, and (ii) total bandwidth used TB(u, v) by these nodes.
10:             end for
11:             Find $v_m \in CN_{uj}$ for which TC(u, v) is maximized, and assign spectrum according to PfSpecAllocClique.
12:             Update TU(u) as
                    TU (u) ← TU (u) + TU (u, $v_m$).
13:             Remove from $CN_{uj}$ nodes in $CN_{uj} \cap N_{vj}$, and also neighbors of $CN_{uj} \cap N_{vj}$ (i.e., nodes that have a neighbor in $CN_{uj} \cap N_{vj}$)
14:         end while
15:     end for
16:     Allocate spectrum to the node $u_m$ in $G_{cand}$ that has maximum TU (u), i.e., $$u_m = \arg\max_{u \in \text{Nodes in } G_{cand}} TU(u)$$

17:     Let V be the set of nodes that get some spectrum in the previous step. Now, update $G_{cand}$ by deleting all nodes in V and their neighbors.
18: end while Algorithm two has three distinct stages. Stage 1 is computing the total utility in the neighborhoods, stage 2 is allocating spectrum to the best neighborhood, and stage 3 is repetition of the steps associated with stage 1 and stage 2.

Stage 1: Computing the total utility in the neighborhoods: This is shown in one iteration of the for loop (step 3) because this step is repeated. This stage first computes the total system utility TU(u), ∀u achievable by the neighborhoods of the different nodes. The following two sub-stages illustrate the computation for the neighborhood of u (steps 5-14):

Sub-stage 1A, for every node v that is a neighbor of u, consider the set of nodes that are neighbors of both v and u, for example, consider the set $N_{uj} \cap N_{vj}$. Next, treat this set $N_{uj} \cap N_{vj}$ as a clique and use algorithm one (PfSpecAllocClique) to find the total attainable utility TU(u,v). The algorithm then finds the node $v_m \in N_{uj}$ for which TU(u,v) is maximum, and the corresponding TU(u, $v_m$) is added to the existing value of TU(u).

Sub-stage 1B, remove the following nodes from consideration: the node $v_m$, node $v_m$'s neighbors (that also belong to $N_{uj}$) that were allocated in the previous step, and neighbors of all nodes who were allocated. Step 1 is then repeated within the neighborhood of u, until all neighbors of u are exhausted.

Stage 2: Allocating spectrum to the best neighborhood: (as shown in step 16), find the node u for which TU(u) is maximum, for example, find the node $u_m$ for which the neighborhood produces the maximum value of total utility. Actual spectrum allocation may then done to the nodes in $N_{uk}$ in accordance with stage 1.

Stage 3: Repetition of the steps: All the nodes that get an allocation may be removed from consideration, their neighbors may also be removed (step 17). The algorithm repeats the first two stages on the new graph, and enters one more iteration of the for loop (step 3)

Pseudo-code for algorithm three (PfMultWSMultRadio) is as follows:

---

Algorithm 3 PfMultWSMultRadio: Prop. Fair Spectrum Allocation

1: Initialize the bandwidth allocation. Denote by $r_{il}$ the data rate $AP_i$ gets in $WS_l$, and $R_i$ as the total data rate given to $AP_i$.

$$r_{il} := 0, R_i = \sum_l r_{il}$$

2: repeat
3:    for l = 1 to $N_{WS}$ do
4:       Compute, $n_{il}$, the total data rate to $AP_i$ in the ACI causing whitespaces of $WS_l$ as $$n_{il} = \sum_{lsACI \le j \le rsACI, j \ne l} r_{ij},$$

where lsACI (rsACI) is the leftmost (rightmost) ACI causing whitespace of $WS_l$.

5:       Define $m_{il}$ as the threshold above which data rate to $AP_i$ is useful in $WS_l$ as follows:

$$m_{il} = \begin{cases} n_{il} & \text{if } n_{il} \ne 0 \\ 0 & \text{elseif } |\{l : r_{il} > 0\}| < N_{rad} \\ \min_j r_{ij} & \text{else} \end{cases}$$

6:       Define the following log-utility for $AP_i$
$$U_i^{(l)}(x_{il}) = d_i[\log(1 + R_i - r_{il} + (x_{il} - m_{il})^+) - \log(1 + R_i - r_{il})] =$$

$$d_i \log\left(1 + \frac{(x_i - m_{il})^+}{1 + R_i - r_{il}}\right).$$

7:       Run BestNeighborFirst to maximize $\Sigma_i U_i^{(l)}(x_{il})$. Let $TU_l$ be the total utility as computed by BestNeighborFirst.
8:    end for
9:    Find the WS which gives the best improvement, i.e., find $l^*$ such that $$l^* = \arg\max_l \left[TU_l + \sum_i d_i \log(1 + R_i - r_{il})\right].$$

10:   Reallocate spectrum to $WS_{l^*}$ according to spectrum allocation produced by running BestNeighborFirst for maximizing $\Sigma_i U_i^{(l)}$.
11:   Perform the following sub-steps:
     11-1. For every AP, remove spectrum allocation from adjacent ACI-causing whitespaces of $l^*$, if any.
     11-2. For every AP, if there was no allocation in the ACI-

---

-continued

Algorithm 3 PfMultWSMultRadio: Prop. Fair Spectrum Allocation causing whitespaces, then remove spectrum allocation from the whitespace that provides $N_{rad}^{th}$ least data rate to AP (this could be zero if less than $N_{rad}$ radios have spectrum allocation).
12: until the loop is executed $\Theta(N_{WS} \log(1/\epsilon))$ times

---

Allocation of spectrum with multiple whitespaces and multiple radios is different from the allocation of spectrum in a single whitespace and a single radio per access point 205 because, unlike in a single whitespace, with multiple whitespaces and multiple radios the access points 205 may be assigned $N_{rad}$ distinct contiguous whitespaces so long as the spectrum bands allocated to an access point 205 respect an ACI constraint. Nevertheless, the algorithm for single whitespace may be used to develop an algorithm for the allocation of spectrum with multiple whitespaces and multiple radios.

A local search approach may be motivated by a so called generalized assignment problem (GAP). The maximum GAP is as follows: given bins and items, value of packing item-i in bin-j, and a packing constraint for each bin that only allows a certain subset of items for each bin, the GAP problem is to find an assignment that maximizes the total value of the packed items. For ease of explanation, the algorithm for the case when $W_j \le B_m$ will be described, for example, when the whitespace widths are no more than the maximum bandwidth a radio can support. Further whitespace widths are no more than, for example, 30 MHz or 42 MHz for most large cities and $B_m$ may be relatively larger than this (for example, $B_m$=40 MHz for latest GNU-radios).

If the width of some of the whitespaces is more than $B_m$, algorithm three first performs a pre-processing step that performs the following: (i) partitions the whitespaces with bandwidth more than $B_m$ into segments of width $B_m$ (except for the last segment) and treats each segment as a whitespace, and (ii) for each segment to be treated as a whitespace, algorithm three, shown above, finds the whitespace properties like center frequency, bandwidth, and data rate for the AP's per unit of bandwidth.

If $W_j \le B_m$ for all j, spectrum allocation within a single whitespace may be no different from spectrum allocation in a single whitespace and single radio per access point 205 allocation as described above. Algorithm three starts by allocating no spectrum to any radio of any of the access points 205. Algorithm three includes three iterative stages. Stage 1 includes steps 3-8, stage 2 includes steps 9-11, and stage 3 includes steps 2-12 (iterative performance of stage 1 and stage 2). Algorithm three performs the following:

Stage 1, for each whitespace, compute the improvement that may result from reallocating spectrum in that whitespace alone. This step may be performed by using the spectrum allocation algorithm for single whitespace. Reallocating spectrum to an access point 205 in a whitespace $WS_1$ may result in violation of constraints, for example, ACI and the constraint that no AP can be allocated more than $N_{rad}$ distinct bands of spectrum. Thus, allocating spectrum to an access point 205 in $WS_1$ may be feasible if the constraints are not violated. This may be achieved if spectrum reallocation in $WS_1$ is followed by a removal of the allocation, from the whitespaces, any allocations that violate any constraints. To this end, variable $m_{il}$ denoting the amount of data rate that may be deducted from current (e.g., at the end of the previous iteration) data rate to access point $AP_i$ so that allocation in $WS_1$ to $AP_i$ does not violate any constraints is defined.

The computation of $m_{il}$ is shown in step 4-5 of algorithm three. Essentially, in these steps, the reduction in data rate of $AP_i$ is reduced so that allocation in $WS_1$ does not violate any constraints. Step 6 of algorithm three defines the objective functions that capture the relatively best reallocation to perform in $WS_1$. Note that, if reallocation is performed in $WS_1$, then first removing the current allocation in $WS_1$ is performed. If the current data rate to $AP_i$ in $WS_1$ is $r_{il}$ and $R_i=\Sigma_l r_{il}$, then an additional $x_{il}$ units of data rate to $AP_i$ from reallocation in $WS_1$ results in a total data rate of $R_i-r_{il}+(x_{il}-m_{il})^+$ to $AP_i$. The term $(x_{il}-m_{il})^+$ can be explained by the fact that, if $x_{il}<m_{il}$, then it is better to not perform reallocation in $WS_1$. Therefore, the improvement (as compared to allocation left after removing the allocation in $WS_1$ from the previous iteration) in log utility of $AP_i$ that can be had from the reallocation is:

$$U_i^{(l)}(x_{il})=d_i[\log(1+R_i-r_{il}+(x_{il}-m_{il})^+)-\log(1+r_i-r_{il})] \quad (15)$$

Equation 15 may be used to explain step 6 of algorithm three. In the step 7 of algorithm three, use algorithm two to maximize $\Sigma_i U_i^{(l)}(x_{il})$. The output of step 7 of algorithm three is the improvement that may result from the reallocation denoted $TU_1$.

Stage 2, steps 9-11 of algorithm three find the whitespace where reallocation results in maximum improvement in the total utility, and then, does the reallocation in that whitespace. For the access points 205 that get this re-allocated spectrum, to prevent the constraints from being violated the data rates may be reduced appropriately (as described in above in step 1).

Stage 3, the iterative steps are repeated $\Theta(N_{WS}\log(1/\epsilon))$ times.

Controller to Allocate Whitespace Spectrum

Figure 3:
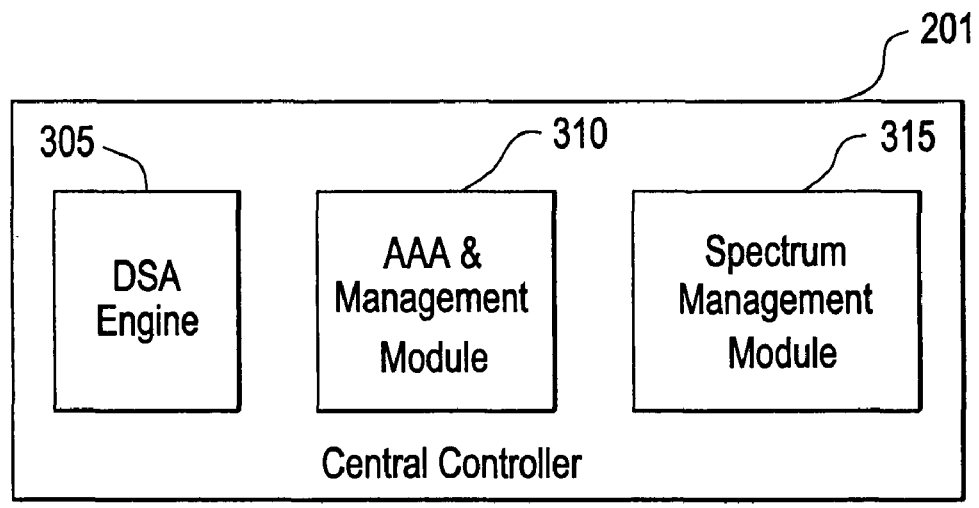
FIG. 3 illustrates a central controller according to example embodiments.

FIG. 3 illustrates a central controller 201 according to example embodiments. The central controller 201 includes a Dynamic Spectrum Allocation Engine 305, an Authentication, Authorization, and Accounting (AAA) and Management module 310 and a Spectrum Management Module 315. The AAA and management module 310 is responsible for authentication, accounting and other network management. The AAA and management module 310 is known to those skilled in the art and will not be discussed further. The Spectrum Management Module 315 is responsible for spectrum division and assignment of control channel frequencies. The Spectrum Management Module 315 may be a separate module within the central controller 201 or incorporated into the Dynamic Spectrum Allocation Engine 305.

Figure 4:
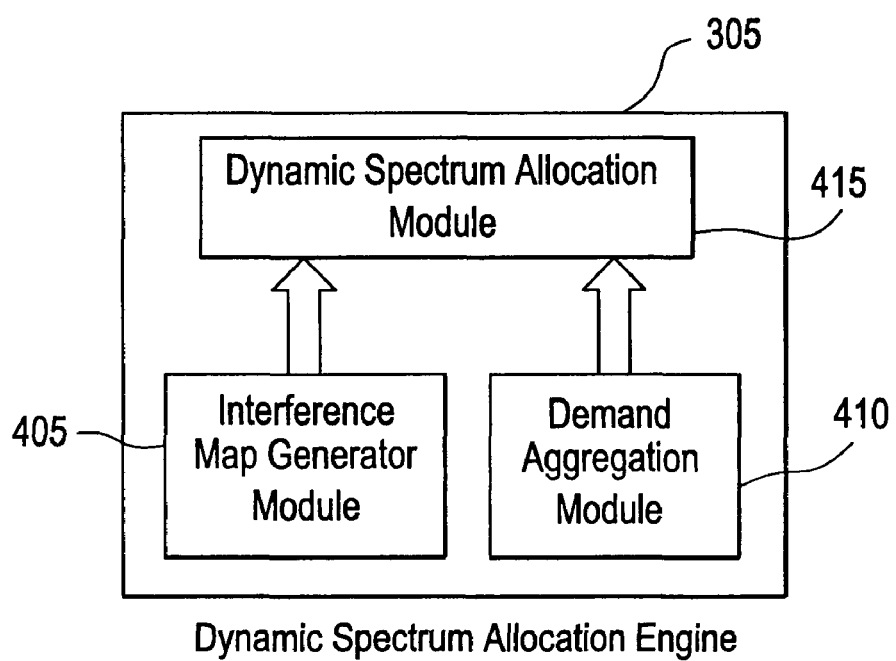
FIG. 4 illustrates the Dynamic Spectrum Allocation Engine illustrated in FIG. 3 according to example embodiments.

FIG. 4 illustrates the Dynamic Spectrum Allocation Engine 305 illustrated in FIG. 3. The Dynamic Spectrum Allocation Engine 305 illustrated in FIG. 4 includes an interference map generator module 405, a demand aggregation module 410 and a dynamic spectrum allocation module 415.

The interference map generator module 405 generates an interference map between the different access points 205. The interference map generator module 405 may use equation 11 as developed above to generate interference maps. Equation 11 shows that if either of $P_r(f_1)$ or $Pr(f_2)$ is known, then the other can be inferred. If each access point 205 experiences different amounts of ambient interference in each whitespace, then the following two step process may be followed. In the first step, each access point 205 reports (e.g., via the control channel) the ambient interference an access point 205 experiences in each whitespace to the central controller 201. In the second step, measurements at any one frequency (e.g., $f_1$) are used to estimate if the total interference (ambient plus induced interference) experienced by the access point 205 in the other frequency (e.g., $f_2$) exceeds a given threshold.

Preferably, lower frequencies may be used to infer interference at higher frequencies because for a given receiver sensitivity, and messages at lower frequencies are more likely to be received by an access point 205. Further, using lower frequency bands to estimate interference graphs in the higher frequency bands is preferred.

Methods for Allocating Whitespace Spectrum

Figure 5:
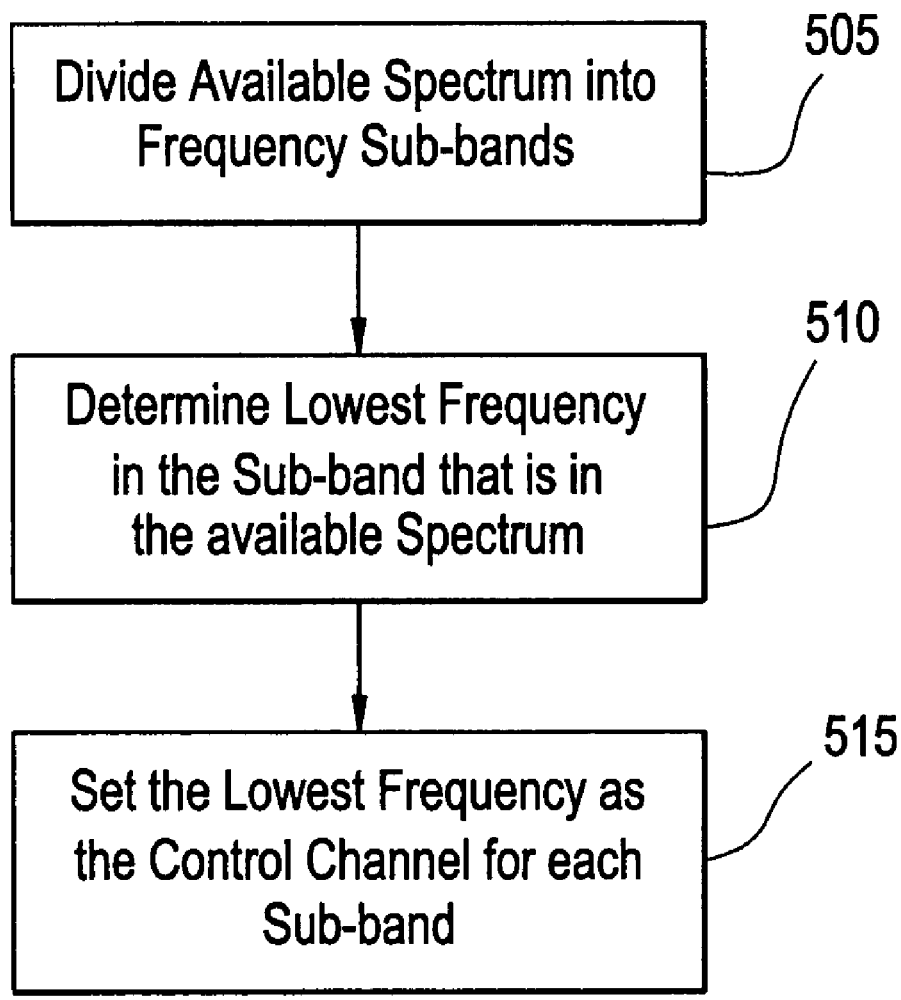
FIG. 5 illustrates a method for generating frequency sub-bands and assigning control channels in available whitespaces according to example embodiments.

FIG. 5 illustrates a method for generating frequency sub-bands and assigning control channels in available whitespaces. Initially, the available whitespace spectrum may be split into k MHz sub-bands, by the spectrum management module 315, as shown in FIG. 5 assuming:
  1. there are n frequency bands available, with the $i^{th}$ available spectrum ranging from $f_1^i$ to $f_h^i$, for example, the available spectrum bands may be represented by the set $S=\{(f_1^1,f_h^1),(f_1^2,f_h^2),\ldots,(f_1^n,f_h^n)\}$;
  2. F MHz is the band within which equation 11 holds with a high degree of accuracy (typically, for example, on the order of a few hundred MHz);
  3. the minimum amount of spectrum allocable to an access point 205 is k MHz, k<<F, k may be as small as, for example, 1 MHz, while F may be, for example, on the order of 100 MHz.

In step S505, the spectrum management module 315 divides the available spectrum from $f_1^1$ to $f_h^n$ into sub-bands of F MHz. There are M=ceil$((f_h^n-f_1^1)/F)$ such sub-bands. The number (M) and bandwidth of the sub-bands may be a design choice. The number (M) and bandwidth of the sub-bands may be static or dynamic.

In step S510, in each sub-band I, i=1,..., M, the spectrum management module 315 determines $f_i$ as the lowest frequency which intersects set S. Set S is described above. In step S515, the spectrum management module 315 sets $f_1$ to be the ith control channel. Therefore, there are M control channels. Each control channel may be used to transmit a beacon signal as described below.

Figure 6:
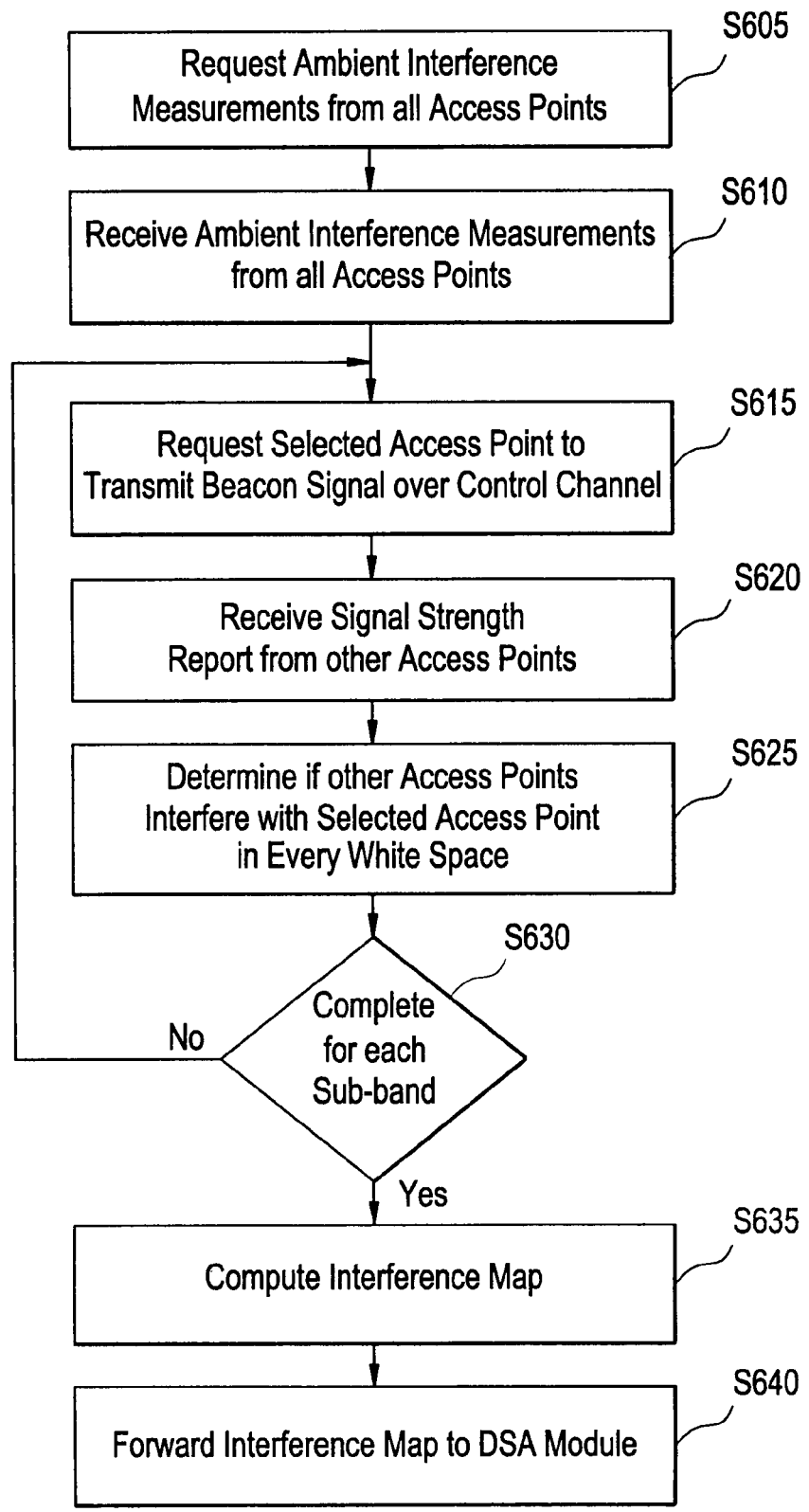
FIG. 6 illustrates a method for determining interference maps for whitespaces according to example embodiments.

FIG. 6 illustrates a method for generating interference maps. The method of FIG. 6 may be based on the whitespace allocation algorithms one, two and three detailed above. The interference maps may be generated by the interference map generator module 405 for each of the control channels described above with regard to FIG. 5.

Concurrently with the filing of the present application, the Applicants have filed A Method and Access Point for Allocating Whitespace Spectrum Ser. No. 12/801,363, the entire contents of which is herein incorporated by reference.

In step S605, the interference map generator module 405 requests an ambient interference measurement from all access points 205. As a result of the request, each access point 205 measures ambient interference over every k MHz width (the minimum allocable amount of spectrum to an access point 205). Ambient interference measurements may be, for example, power measurements or received signal strength indication (RSSI) measurements. In step S610, the interference map generator module 405 receives ambient interference measurements from each access point 205.

The request for and the reception of ambient interference measurements is steps S605 and S610 may be transmitted over, for example, the control channel established in step S515 described above with regard to FIG. 5. For each control channel $f_i$, i=1,..., M, the interference map generator module 405 performs steps S615-S625 iteratively.

In step S615, the interference map generator module 405 may request a selected access point 205 to transmit a beacon over control channel $f_i$. For example, if the selected access point 205 is transmitting at a given time, then all other access points 205 may remain silent and measure the received signal strength from the selected transmitting access point 205.

As a result of the request, the other access points 205 make measurements of the beacon. Measurements of the beacon may be, for example, power measurements or received signal strength indication (RSSI) measurements. In step S620, the interference map generator module 405 receives measurements. The measurements may be, for example, power measurements received from the other access points 205. The measurements may be average power measurements. The interference map generator module 405 may receive the measurements over a control channel associated with the other access points 205 or over a common control channel.

In step S625, the interference map generator module 405 determines if the other access points 205 interfere with the selected access point 205 in every available whitespace. For example, if the received signal strength reported by one of the other access points $AP_r$ is above a given threshold, then the selected access point 205 is designated as an interfering access point for APr.

In step S630, if steps S615-S625 for each control channel (sub-band) have not been performed, then control returns to step S615. Otherwise, in step S635, using measurements on each control channel $f_i$, the ambient interference measurements over each k MHz band and equation 11, the interference map generator module 405 computes the interference map for $I=S \cap (f_i, f_i+F)$ over each k MHz band in set I.

In the absence of ambient interference, the interference map generator module 405 may calculate using the measurements on each control channel $f_i$, and equation 2. In step S640, the interference map generator module 405 forwards the interference map to the dynamic spectrum allocation module 415.

The demand aggregation module 410 may be configured to provide, as input to the dynamic spectrum allocation module 415, the aggregate demand which accounts for user demands and locations. The demand aggregation module 415 may use the aggregate spectral efficiency (ASE) metric and equation 13 as developed above to determine the aggregate demand.

Figure 7:
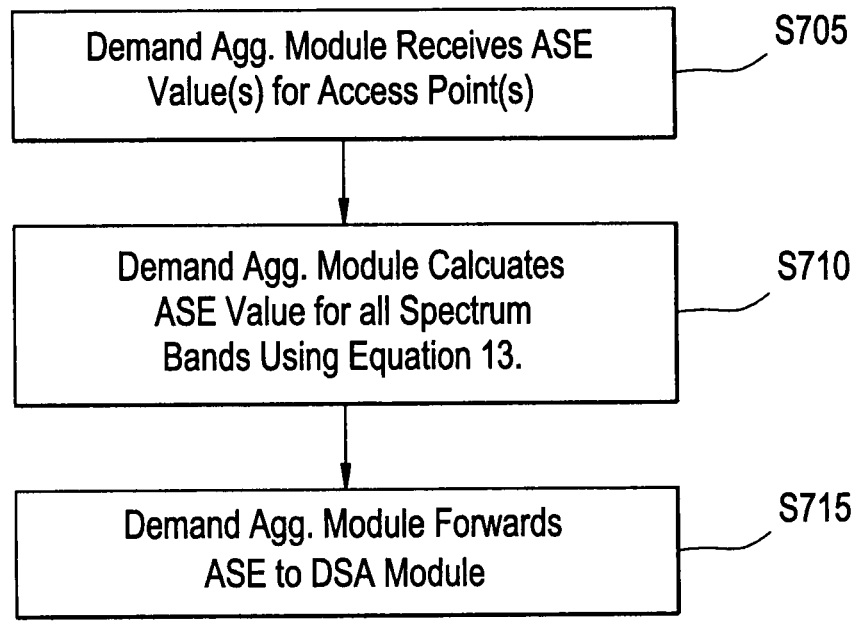
FIG. 7 illustrates a method for demand aggregation according to example embodiments.

FIG. 7 illustrates a method for demand aggregation according to example embodiments. FIG. 7 may be based on the whitespace allocation algorithms one, two and three detailed above.

In step S705, an ASE at some frequency $f_i$ is received from an access point 205 by the demand aggregation module 410. The transmission of the ASE at $f_1$ may be, for example, via a common control channel, via a control channel associated with a frequency band or via a control channel associated with an access point 205. Frequency $f_1$ may be the lowest frequency in the frequency band.

For example, an access point 205 may transmit an ASE value upon initialization of an access point 205. Alternatively, an access point 205 may transmit an ASE as a result of a change in demand based on, for example, adding or removing a client or a requested increase or decrease for demand by a client. As described above, ASE may be calculated by an access point 205 using equation 12.

In step S710, the demand aggregation module 410 calculates new ASE values for all frequency bands. For example, the demand aggregation module 410 may use equation 13 developed above and the ASE at frequency $f_1$ to calculate new ASE values for all frequency bands. In step S715, the demand aggregation module 410 forwards the new ASE values to the dynamic spectrum allocation module 415.

Figure 8:
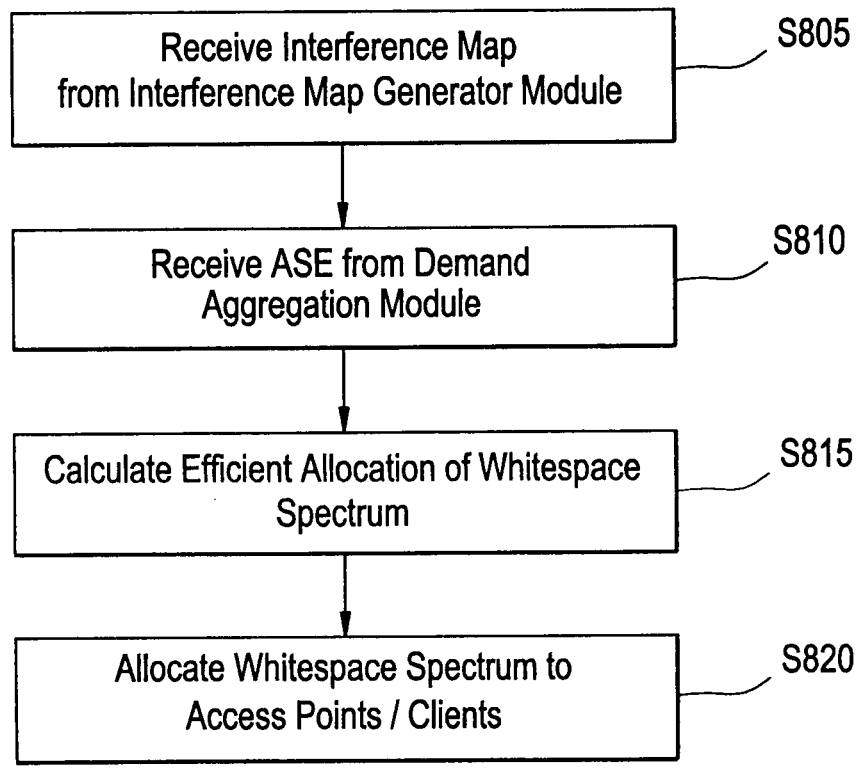
FIG. 8 illustrates a method for allocating whitespace spectrum according to example embodiments.

FIG. 8 illustrates a method for allocating whitespace spectrum by the dynamic spectrum allocation module 415. The method of FIG. 8 may be based on the whitespace allocation algorithms one, two and three detailed above.

In step S805, the dynamic spectrum allocation module 415 receives the interference map from the interference map generator module 405. In step S810, the dynamic spectrum allocation module 415 receives ASE values from the demand aggregation module 415. In step S815, the dynamic spectrum allocation module 415 calculates an efficient allocation of whitespace spectrum. For example, the dynamic spectrum allocation module 415 may use the new ASE values to allocate spectrum to access points 205.

The dynamic spectrum allocation module 415 may use, for example, whitespace allocation algorithm one described above and equations 13 and 14 to allocate whitespace spectrum. Alternatively, the dynamic spectrum allocation module 415 may use, for example, whitespace allocation algorithm two described above and equations 13 and 14 to allocate whitespace spectrum. Alternatively, the dynamic spectrum allocation module 415 may use, for example, whitespace allocation algorithm three described above and equations 13-15 to allocate whitespace spectrum.

As described above, each of whitespace allocation algorithms one, two and three were developed to fairly and efficiently allocate spectrum bands associated with available whitespaces to a combination of access points 205 and clients or users 210. The dynamic spectrum allocation module 415 may use either of the aforementioned algorithms to allocate whitespace spectrum. However, example embodiments are not limited thereto.

In step S820, the dynamic spectrum allocation module 415 allocates whitespace spectrum to access points 205 and/or clients 210. The dynamic spectrum allocation module 415 may generate as output a set of spectrum bands allocated to each access point 205 and possibly the set of clients 210 which may be associated with each access point 205. The dynamic spectrum allocation module 415 may compute an efficient allocation of the available whitespaces based on interference maps, ASEs, adjacent channel interference constraints, transmit power constraints, and demands.

The dynamic spectrum allocation module 415 may determine if the access points 205 include two or more radio transmitters each capable of transmitting signals over a plurality of frequencies. The dynamic spectrum allocation module 415 may identify groups of access points 205 neighboring each other, and the dynamic spectrum allocation module 415 may allocate whitespace spectrum based on prioritizing the groups of access points 205, the interference map and the aggregate demand if the access points 205 do not include two or more radio transmitters. Alternatively, the dynamic spectrum allocation module 415 may allocate sub-bands of the whitespace spectrum based on a utilization of the sub-bands, the interference map and the aggregate demand if the access points include two or more radio transmitters.

The dynamic spectrum allocation module 415 may calculate utilization of the sub-bands based on a utility calculation, e.g. whitespace allocation algorithms one, two and three, for each of the access points and calculate a maximum utilization improvement based on a utilization of each of the set of frequency bands. The dynamic spectrum allocation module 415 may allocate the sub-bands based on the utilization improvement. The dynamic spectrum allocation module 415 may allocate the set of frequency bands based on a guard band associated with adjacent frequency bands, a transmit power constraint and a demand of one or more users associated with each of the access points.

FIG. 9 is a signal flow diagram associated with allocation of whitespace frequency bands according example embodiments. Initially, the system is in a static condition, for example, a static number of clients 210 are on the system. During the static condition, access points 205 send beacons to clients 210 and RSSI values for other access points 205 over a control channel. The dynamic spectrum allocation module 415 determines access point 205 neighbors associated with each whitespace.

If, for example, a new client initiates an associate request including a demand value and an RSSI value to at least one of the access points 205, the access points 205 send client demand values and aggregate RSSI values to the central controller 201.

The demand aggregation module 410 may then compute ASE values for each whitespace, and the dynamic spectrum allocation module 415 may compute spectrum allocation as discussed above with regard to FIG. 8 and the dynamic spectrum allocation module 415. The central controller 201 then sends allocation messages to the access points 205. The access points 205 and the clients 210 then communicate data at a determined transmission power until a dissociation request is received by an access point.

While example embodiments have been particularly shown and described, it will be understood by one of ordinary skill in the art that variations in form and detail may be made therein without departing from the spirit and scope of the claims.

We claim:

1. A controller comprising:
    a first module configured to generate an interference map associated with a set of frequency bands and associated with a plurality of access points;
    a second module configured to aggregate a plurality of demands to produce an aggregate demand, each of the plurality of demands associated with one of the plurality of access points;
    a third module configured to dynamically allocate the set of frequency bands to each of the plurality of access points based on the interference map and the aggregate demand.

2. The controller of claim 1, wherein
    the first module is configured to receive an ambient interference value associated with a first frequency from each of the access points,
    the first module is configured to calculate a plurality of interference values for each of the access points, each of the interference values being calculated at a plurality of second frequencies based on the received ambient interference value, and
    the first module is configured to generate the interference map based on an available spectrum band, the received ambient interference values, and the calculated interference values.

3. The controller of claim 2, wherein the first module is configured to receive the ambient interference values from the access points via a control channel.

4. The controller of claim 2, wherein, in the absence of ambient interference, the first module calculates each of the calculated interference values such that, $$Pr(f1) - Pr(f2) = 10 \text{ coeff} \log_{10}(f2/f1), \text{ where}$$

f1 is the first frequency;
f2 is one of the plurality of second frequencies;
Pr(f1) is the calculated interference value at the first frequency received from one of the access points;
Pr(f2) is a calculated interference value at one of the plurality of second frequencies f2; and coeff is an environment dependent parameter obtained through measurements.

5. The controller of claim 1, wherein
    the second module is configured to receive an average interference value from each of the access points;
    the second module is configured to receive a first aggregate spectral efficiency value associated with a first frequency from each of the access points;
    the second module is configured to calculate a plurality of second aggregate spectral efficiency values associated with a plurality of second frequencies for each of the access points; and
    the second module aggregates the plurality of demands to produce an aggregate demand based on the first aggregate spectral efficiency value and the second aggregate spectral efficiency values.

6. The controller of claim 5, wherein
    the first frequency is the lowest frequency in a band of the set of frequency bands; and
    the first aggregate spectral efficiency value for each access point is based on, $$ASE(f1) = a + \frac{b}{N} \sum_{k=1}^{N} SINR_k(f1),$$

where
    ASE(f1) is the aggregate spectral efficiency value associated with the first frequency;
    a and b are constants;
    N is a number users;
    k is the user for which the ASE is being calculated; and
    SINR is a Signal to Interference-plus-Noise Ratio.

7. The controller of claim 5, wherein
    the second module calculates the second aggregate spectral efficiency values for each access point such that, $$ASE(f1) - ASE(f2) = 10 \text{ coeff} \log_{10}(f2/f1), \text{ where}$$

f1 is the first frequency;
f2 is one of the second frequencies;
coeff is an environment dependent parameter obtained through measurements;
ASE(f1) is the first aggregate spectral efficiency value received from one of the access points; and
ASE(f2) is the calculated second aggregate spectral efficiency value at the second frequency f2 for the access point.

8. The controller of claim 1, wherein
    the controller is configured to determine if the access points include two or more radio transmitters each capable of transmitting signals over a plurality of frequencies,
    the controller is configured to identify groups of access points neighboring each of the access points, and the third module is configured to allocate the set of frequency bands based on prioritizing the groups of access points, the interference map and the aggregate demand if the access points do not include two or more radio transmitters, and
    the third module is configured to allocate sub-bands of at least one of the frequency bands based on a utilization of the sub-bands, the interference map and the aggregate demand if the access points include two or more radio transmitters.

9. The controller of claim 8, wherein
the third module is configured to calculate utilization of the sub-bands based on a utility calculation for each of the access points and configured to calculate a maximum utilization improvement based on a utilization of each of the set of frequency bands, and
the third module is configured to allocate the sub-bands based on the utilization improvement.

10. The controller of claim 8, wherein the third module is configured to allocate the set of frequency bands based on a guard band associated with adjacent frequency bands, a transmit power constraint and a demand of one or more users associated with each of the access points.

11. A method for allocating a set of frequency bands to a plurality of access points, the method comprising:
generating, by a controller, an interference map associated with the set of frequency bands and associated with the plurality of access points;
aggregating a plurality of demands to produce an aggregate demand, each of the plurality of demands associated with one of the plurality of access points; and
dynamically allocating, by the controller, the set of frequency bands to each of the plurality of access points based on the interference map and the aggregate demand.

12. The method of claim 11, comprising:
receiving, by the controller, a signal strength indicator from each of the access points;
determining, by the controller, an access point neighbor relationship for each of the access points;
receiving, by the controller, the plurality of demands based on one or more users associated with each of the access points; and
sending the allocated set of frequency bands to each of the plurality of access points.

13. The method of claim 11, comprising:
receiving, by the controller, an ambient interference value associated with a first frequency from each of the access points; and
calculating, by the controller, a plurality of interference values for each of the access points, each of the interference values being calculated at a plurality of second frequencies based on the received ambient interference value, wherein
the interference map is generated based on an available spectrum band, the received ambient interference values, and the calculated interference values.

14. The method of claim 13, wherein
the ambient interference values are received from the access points via a control channel.

15. The method of claim 13, wherein, in the absence of ambient interference, each of the calculated interference values are calculated such that, $$Pr(f1) - Pr(f2) = 10 \, \text{coeff} \, \log_{10}(f2/f1), \text{ where}$$

f1 is the first frequency;
f2 is one of the plurality of second frequencies;
coeff is an environment dependent parameter obtained through measurements;
Pr(f1) is the ambient interference value at the first frequency received from one of the access points; and
Pr(f2) is a calculated interference value at one of the plurality of second frequencies f2.

16. The method of claim 11, comprising
receiving an average interference value from each of the access points;
receiving a first aggregate spectral efficiency value associated with a first frequency from each of the access points; and
calculating a plurality of second aggregate spectral efficiency values associated with a plurality of second frequencies for each of the access points, wherein
the aggregate demand is based on the first aggregate spectral efficiency value and the second aggregate spectral efficiency values.

17. The method of claim 16, wherein
the first frequency is the lowest frequency in a band of the set of frequency bands; and
the first aggregate spectral efficiency value is based on, $$ASE(f1) = a + \frac{b}{N} \sum_{k=1}^{N} SINR_k(f1),$$

where
ASE(f1) is the aggregate spectral efficiency value associated with the first frequency;
a and b are constants;
N is a number of users;
k is the user for which the ASE is being calculated; and
SINR is a Signal to Interference-plus-Noise Ratio.

18. The method of claim 16, wherein
the second aggregate spectral efficiency values are calculated for each access point such that:

$$ASE(f1) - ASE(f2) = 10 \, \text{coeff} \, \log_{10}(f2/f1), \text{ where}$$

f1 is the first frequency;
f2 is one of the second frequencies;
coeff is an environment dependent parameter obtained through measurements;
ASE(f1) is the first aggregate spectral efficiency value received from one of the access points; and
ASE(f2) is the calculated second aggregate spectral efficiency value at the second frequency value f2 for the access point.

19. The method of claim 11, comprising
determining if the access points include two or more radio transmitters each capable of transmitting signals over a plurality of frequencies,
identifying groups of access points neighboring each of the access points, and allocating the set of frequency bands based on prioritizing the groups of access points, the interference map and the aggregate demand if the access points do not include two or more radio transmitters, and
allocating sub-bands of at least one of the frequency bands based on a utilization of the sub-bands, the interference map and the aggregate demand if the access points include two or more radio transmitters.

20. The method of claim 19, comprising
calculating utilization of the sub-bands based on a utility calculation for each of the access points and configured to calculate a maximum utilization improvement based on a utilization of each of the set of frequency bands, and
allocating the sub-bands based on the utilization improvement.

* * * * *